US010925076B2

(12) United States Patent
Wang et al.

(10) Patent No.: US 10,925,076 B2
(45) Date of Patent: Feb. 16, 2021

(54) SIGNALING ASPECTS OF MULTIPLE SR CONFIGURATION FOR SERVICE DIFFERENTIATION

(71) Applicant: Telefonaktiebolaget LM Ericsson (publ), Stockholm (SE)

(72) Inventors: Min Wang, Luleå (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 15/767,198

(22) PCT Filed: Jan. 3, 2018

(86) PCT No.: PCT/EP2018/050140
§ 371 (c)(1),
(2) Date: Apr. 10, 2018

(87) PCT Pub. No.: WO2018/202332
PCT Pub. Date: Nov. 8, 2018

(65) Prior Publication Data
US 2019/0075579 A1 Mar. 7, 2019

Related U.S. Application Data

(60) Provisional application No. 62/502,080, filed on May 5, 2017.

(51) Int. Cl.
*H04W 72/12* (2009.01)
*H04W 80/02* (2009.01)
(Continued)

(52) U.S. Cl.
CPC ... *H04W 72/1242* (2013.01); *H04W 72/0453* (2013.01); *H04W 72/1278* (2013.01);
(Continued)

(58) Field of Classification Search
CPC ............................. H04W 80/02; H04W 72/14
(Continued)

(56) References Cited

U.S. PATENT DOCUMENTS 8,849,292 B2 * 9/2014 Tiirola ................. H04L 5/0048
370/329
2010/0080187 A1 * 4/2010 Papasakellariou .... H04L 5/0051
370/329
(Continued)

FOREIGN PATENT DOCUMENTS

WO 2017150828 A1 9/2017
WO 2018030710 A1 2/2018

OTHER PUBLICATIONS

Samsung Electronics R&D Institute UK, "Scheduling Request design for multi-numerology support", 3GPP TSG-RAN WG2 #98, Agenda Item 10.3.15, Hangzhou, China, May 15-19, 2017, pp. 1-2, R2-1704573.
(Continued)

*Primary Examiner* — Angel T Brockman
(74) *Attorney, Agent, or Firm* — Coats + Bennett, PLLC

(57) ABSTRACT

A base station configures a terminal with two or more Scheduling Request (SR) configurations. Each SR configuration includes at least one of time and frequency domain resources for a SR, based on information associated with logical channels (LCH). From a received SR transmitted according to a SR configuration, the base station may ascertain that the terminal has data to transmit; the LCH triggering the SR; a priority for each LCH; and/or a set of the numerologies/TTI durations associated with each LCH. Methods disclosed herein provide a signaling alternative for the network to signal multiple SR configurations; provide means for the network to activate/deactivate certain configurations; provide means for the network to switch from one configuration to another one, and signal to the terminal;

(Continued)

and provide means for the terminal to signal configurations from the terminal's preference perspective.

26 Claims, 5 Drawing Sheets

(51) Int. Cl.
    *H04W 72/14*     (2009.01)
    *H04W 76/27*     (2018.01)
    *H04W 72/04*     (2009.01)

(52) U.S. Cl.
    CPC ........... *H04W 72/14* (2013.01); *H04W 76/27* (2018.02); *H04W 80/02* (2013.01)

(58) Field of Classification Search
    USPC ........................................................ 370/329
    See application file for complete search history.

(56) References Cited

U.S. PATENT DOCUMENTS

2013/0044699 A1     2/2013   Eriksson
2013/0163535 A1     6/2013   Anderson et al.

OTHER PUBLICATIONS

LG Electronics Inc., "SR enhancement for New RAT", 3GPP TSG-RAN WG2 #97bis, Agenda Item 10.3.1.5 (NR_newRAT—Core), Spokane, US Apr. 3-7, 2017, R2-1703491 (Revision of R2-1701536).

Qualcomm Incorporated, "Enhancements to SR in NR", 3GPP TSG-RAN WG2 Meeting #98, Agenda Item 10.3.1.5 (NR-newRAT-Core-Release 15), Hangzhou, China May 15-19, 2017, R2-1704900.

3rd Generation Partnership Project, Techical Specification Group Gradio Access Network; Evolved Universal Terrestrial Radio Access (E-UTRA); Medium Access Control (MAC) protocol specification (Release 14); 3GPP TS 36.321 v14.2.1, (Mar. 2017), pp. 1-106.

* cited by examiner

SIGNALING ASPECTS OF MULTIPLE SR CONFIGURATION FOR SERVICE DIFFERENTIATION

TECHNICAL FIELD

The present invention relates generally to wireless communication networks, and in particularly to systems and methods of utilizing Scheduling Request configurations to enhance network operation.

BACKGROUND

Wireless communication networks are widely deployed globally. In a cellular configuration, the Radio Access Network (RAN) of a wireless system comprises a number of generally fixed base stations (referred to as eNodeB, or eNB in the Long Term Evolution, or LTE, and referred to as gNB in New Radio, or NR). Each base station provides wireless communication service to a plurality of terminals, also known as User Equipment (UE), within a geographic area, or cell. Technical specifications for the fifth generation (5G) of cellular wireless networks are being developed by the Third Generation Partnership Project (3GPP). This release is known as New Radio (NR). NR will be operated in frequencies from below 1 GHz to around 100 GHz and the carrier bandwidth may vary over a large range, e.g., 10 MHz to 1 GHz. 3GPP has agreed to use LTE as baseline for uplink (UL) scheduling in NR.

FIG. 1 depicts representative signaling for a UE-initiated UL transmission. The UE initiates the UL transmission (from the UE to the network) by transmitting a Scheduling Request (SR)—either on a dedicated channel (D-SR) if the UE is time-synchronized to the network in the uplink, or on the Random Access Channel (RA-SR) if the UE has lost synchronization or has no D-SR resources. For D-SR, each active user is assigned a dedicated channel for transmitting SR. This prevents the need to transmit UE IDs, as this information is inherent in the channel used, and to avoid intra-cell collisions, as may occur in RA-SR. The D-SR is repeatedly transmitted at consecutive SR opportunities, until the UE receives an UL Grant, the dedicated uplink channel resources are released, or the UE loses uplink synchronization. After D-SR ceases and no DL Grant was received, the UE transmits RA-SR. A Buffer Status Report (BSR) may follow the SR, to apprise the network of the amount of the data the UE has to transmit, and allow the network to prioritize uplink resource allocation between different UEs. 3$^{rd}$ Generation Partnership Project Standard 3GPP TS 36.321 V14.2.1 specifies a framework for buffer status reporting. A BSR is generated in response to a new entry in an empty transmit buffer on the UE, or if the buffer is not empty, upon data being placed in the buffer that belongs to a Logical Channel Group (LCG) having a higher priority than that associated with data already in the buffer. In response to the SR, and subject to system constraints (capacity, congestion, channel conditions, and the like), the eNB sends an UL Grant to the UE, such as on the Physical Downlink Control Channel (PDCCH). The UL Grant informs the UE of uplink resources allocated to it for uplink data transmission. The data streams, or flows, of the UE are mapped to logical channels (LCH) in Layer 2, each channel having a Logical Channel Priority (LCP). The UE MAC scheduler schedules transmissions for the logical channels according to their LCPs. In some network protocols, a logical channel may further be configured with preferred numerology and/or slot duration, to fulfill differentiated delay requirements.

When a UE has multiple logical channels of different priorities, each logical channel may be configured/mapped with different TTI (Transmission Time Interval) lengths/numerology characteristics (e.g., subcarrier spacing, or SCS). The TTI indicate, e.g., the transmission duration. To avoid transmitting data belonging to a LCH having high priority/low latency requirements on a TTI length/numerology leading to a long delay, the UE SR should indicate which logical channel is requesting resources. However, in LTE, a SR is only 1 bit, which is insufficient to differentiate the LCHs.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

It is an object of the present invention to improve the scheduling of radio resources. This object is achieved by the independent claims. Advantageous embodiments are described in the dependent claims.

One embodiment relates to a method, performed by a base station operative in a wireless communication network, of configuring a terminal, such as a UE, with Scheduling Request, SR, configurations. Two or more SR configurations are generated, wherein each SR configuration includes at least one of time and frequency domain resources for a SR, based on information associated with one or more logical channels, LCH. The two or more SR configurations are transmitted to the terminal. An SR for a LCH of the terminal is received.

In one embodiment the SR for a LCH of the terminal is received on a resource indicated by a SR configuration associated with the LCH.

In one embodiment, the method further comprises, after receiving an SR transmitted by the terminal, identifying, based on the SR configurations for the terminal, a LCH that triggered the SR; and ascertaining a priority associated with a data transmission associated with the SR, based on identification of the LCH.

In one embodiment, the method further comprises, after receiving the SR from the terminal, transmitting an uplink grant to the terminal, wherein the uplink grant indicates a numerology or TTI type for the associated uplink data transmission.

In one embodiment, the method further comprises activating or deactivating a specific SR configuration for the terminal by transmitting to the terminal an activation or deactivation command, respectively, identifying the specific SR configuration. In one embodiment, transmitting to the terminal an activation or deactivation command comprises transmitting the activation or deactivation command via one of RRC signaling, Medium Access Control, MAC layer Control Element, CE, a Layer 1 signaling message, and a Layer 2 signaling message.

In one embodiment, the method further comprises switching the terminal from a first SR configuration to a second SR configuration by transmitting to the terminal an activation command identifying the second SR configuration. In one embodiment, the base station first receives, from the terminal which is using the first SR configuration, signaling indicating a preference for the second SR configuration, and then switches the terminal from the first SR configuration to the second SR configuration by transmitting to the terminal an activation command identifying the second SR configuration in response to the received signaling.

In one embodiment, the two or more SR configurations control the format of a multi-bit SR, and the base station further receives a multi-bit SR transmitted by the terminal, and identifies a LCH that triggered the SR by indexing a list using the multi-bit SR.

In one embodiment, the two or more SR configurations control the format of a multi-bit SR, and the base station further receives a multi-bit SR transmitted by the terminal, and identifies a LCH that triggered the SR by indexing the SR configurations using the multi-bit SR, wherein an SR configuration is associated with a LCH.

In one embodiment, generating two or more SR configurations comprises generating fewer SR configurations if the terminal uses a multi-bit SR, and more SR configurations if the terminal uses a single-bit SR.

In one embodiment, generating two or more SR configurations comprises generating the SR configurations based on the availability of system resources. In one embodiment, generating the SR configurations based on the availability of system resources comprises generating multiple SR configurations if multiple SR resources are reserved for an SR control channel, and fewer SR configurations if fewer SR resources are reserved for the SR control channel Another embodiment relates to a base station operative in a wireless communication network. The base station comprises a transceiver and processing circuitry operatively connected to the transceiver. The processing circuitry is configured or operative to generate two or more Scheduling Request, SR, configurations, wherein each SR configuration includes at least one of time and frequency domain resources for a SR, based on information associated with one or more logical channels, LCH; cause the transceiver to transmit the two or more SR configurations to the terminal; and cause the transceiver to receive an SR for a LCH of the terminal.

In another embodiment the processing circuitry is further configured to cause the transceiver to receive an SR for a LCH of the terminal on a resource indicated by a SR configuration associated with the LCH.

In another embodiment the processing circuitry is further configured to, after receiving an SR transmitted by the terminal, identify, based on the SR configurations for the terminal, a LCH that triggered the SR; and ascertain a priority associated with a data transmission associated with the SR, based on identification of the LCH.

In another embodiment, the processing circuitry is further configured to, after receiving the SR from the terminal, cause the transceiver to transmit an uplink grant to the terminal; wherein the uplink grant indicates a numerology or TTI type for the associated uplink data transmission.

In another embodiment, the processing circuitry is further configured to activate or deactivate a specific SR configuration for the terminal by causing the transceiver to transmit to the terminal an activation or deactivation command, respectively, identifying the specific SR configuration.

In another embodiment, the processing circuitry is further configured to cause the transceiver to transmit to the terminal an activation or deactivation command by transmitting the activation or deactivation command via one of RRC signaling, Medium Access Control, MAC, layer Control Element, CE, a Layer 1 signaling message, and a Layer 2 signaling message.

In another embodiment, the processing circuitry is further configured to switch the terminal from a first SR configuration to a second SR configuration by causing the transceiver to transmit to the terminal an activation command identifying the second SR configuration In another embodiment, the processing circuitry is further configured to cause the transceiver to receive, from the terminal using the first SR configuration, signaling indicating a preference for the second SR configuration; and switch the terminal from the first SR configuration to the second SR configuration by causing the transceiver to transmit to the terminal an activation command identifying the second SR configuration in response to the received signaling.

In another embodiment, wherein the two or more SR configurations control the format of a multi-bit SR, the processing circuitry is further configured to cause the transceiver to receive a multi-bit SR transmitted by the terminal; and identify a LCH that triggered the SR by indexing a list using the multi-bit SR.

In another embodiment, wherein the two or more SR configurations control the format of a multi-bit SR, the processing circuitry is further configured to cause the transceiver to receive a multi-bit SR transmitted by the terminal; and identify a LCH that triggered the SR by indexing the SR configurations using the multi-bit SR, wherein an SR configuration is associated with a LCH.

In another embodiment, the processing circuitry is further configured to generate two or more SR configurations by generating fewer SR configurations if the terminal uses a multi-bit SR, and more SR configurations if the terminal uses a single-bit SR.

In another embodiment, the processing circuitry is further configured to generate two or more SR configurations by generating the SR configurations based on the availability of system resources.

In another embodiment, the processing circuitry is further configured to generate the SR configurations based on the availability of system resources by generating multiple SR configurations if multiple SR resources are reserved for an SR control channel, and fewer SR configurations if fewer SR resources are reserved for the SR control channel.

Yet another embodiment relates to a method, performed by a terminal operative in a wireless communication network, of transmitting Scheduling Requests, SR. Two or more SR configurations are received from a base station, wherein each SR configuration includes at least one of time and frequency domain resources for a SR, based on information associated with one or more logical channels, LCH. In response to data associated with a LCH being available for transmission, an SR is generated based on the two or more SR configurations. The SR is transmitted to the base station.

In yet another embodiment, the SR is transmitted to the base station by using a transmission resource indicated by the SR configuration associated with the LCH.

In yet another embodiment, after transmitting the SR to the base station, an uplink grant is received from the base station. The uplink grant indicates a numerology or TTI type for the associated uplink data transmission.

In yet another embodiment, an activation or deactivation command identifying a specific SR configuration is received from the base station. The specific SR configuration is activated or deactivated, respectively.

In yet another embodiment the terminal uses a first SR configuration, and, prior to receiving an activation command from the base station, signaling indicating a preference for a second SR configuration is transmitted to the base station.

In yet another embodiment, receiving from the base station an activation or deactivation command comprises receiving the activation or deactivation command via one of RRC signaling, Medium Access Control, MAC, layer Control Element, CE, a Layer 1 signaling message, and a Layer 2 signaling message Still another embodiment relates to a terminal operative in a wireless communication network. The terminal includes one or more antennas and a transceiver operatively connected to the antennas. The terminal also includes processing circuitry operatively connected to the transceiver. The processing circuitry is operative to cause the terminal to receive from a base station two or more Scheduling Request, SR, configurations, wherein each SR configuration includes at least one of time and frequency domain resources for a SR, based on information associated with one or more logical channels, LCH; in response to data associated with a LCH being available for transmission, generate an SR based on the two or more SR configurations; and transmit the SR to the base station.

In still another embodiment the processing circuitry is further operative to cause the terminal to transmit the SR to the base station using a transmission resource indicated by the SR configuration associated with the LCH.

In still another embodiment, the processing circuitry is further operative to cause the terminal to, after transmitting the SR to the base station, receive an uplink grant from the base station, wherein the uplink grant indicates a numerology or TTI type for the associated uplink data transmission.

In still another embodiment, the processing circuitry is further operative to cause the terminal to receive from the base station an activation or deactivation command identifying a specific SR configuration; and activate or deactivate the specific SR configuration, respectively.

In still another embodiment, wherein the terminal uses a first SR configuration, the processing circuitry is further operative to cause the terminal to, prior to receiving an activation command from the base station, transmit signaling to the base station indicating a preference for a second SR configuration.

In still another embodiment, the processing circuitry is further operative to cause the terminal to receive from the base station an activation or deactivation command by receiving the activation or deactivation command via one of RRC signaling, Medium Access Control, MAC, layer Control Element, CE, a Layer 1 signaling message, and a Layer 2 signaling message.

This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

BRIEF DESCRIPTION OF THE DRAWINGS

The present invention will now be described more fully hereinafter with reference to the accompanying drawings, in which embodiments are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
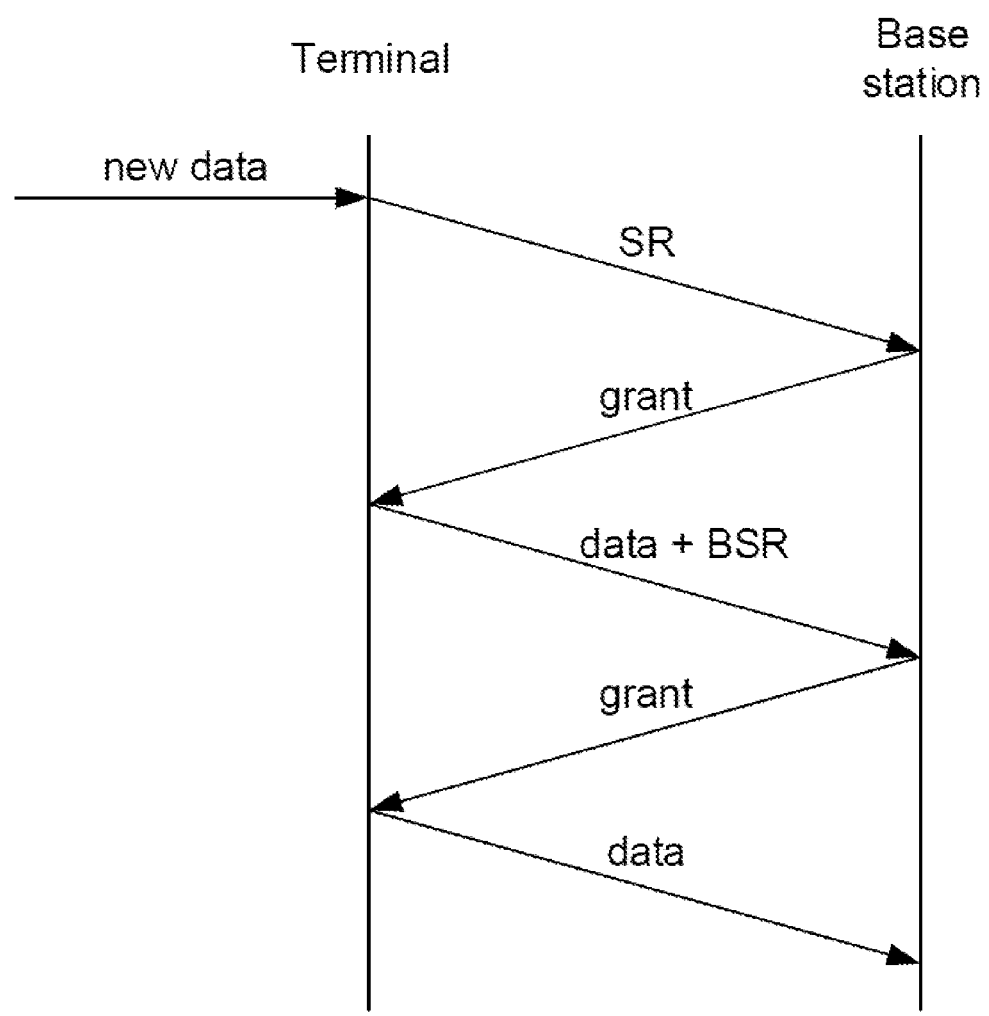
FIG. 1 is a signaling diagram of a terminal-initiated uplink transmission.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. The following presents a simplified summary of the disclosure in order to provide a basic understanding to those of skill in the art. According to one or more embodiments disclosed herein, methods are provided to signal multiple SR configurations between a UE and the network. The configurations allow the UE to signal information to the network with the SR, such as indicating that the UE has data to transmit;
the buffer size for each logical channel;
a priority indication for each channel; and
indicating a set of the numerologies/TTI durations associated with each logical channel.

Several specific aspects of this method include:
Providing a signaling alternative for the network to signal multiple SR configurations;
Providing means for the network to activate/deactivate certain configuration;
Providing means for the network to switch from one configuration to another one, and signal to the UE; and
Providing means for the UE to signal configurations from the UE's preference perspective To efficiently schedule UL resources for a UE, the serving network node (gNB) should be aware of more information than can be conveyed in the LTE single-bit SR. This information includes, e.g., indicating that the UE has data to transmit; the buffer size for each logical channel; a priority indication for each channel; and indicating a set of the numerologies/TTI durations associated with each logical channel. To reduce the latency due to dynamic scheduling, and improve the resource utilization efficiency, the above information should be provided on time and accurately by UE via SR and BSR. By knowing the type/priority of the logical channel, the gNB can provide grants for the traffic that should be scheduled. This enables a more correct priority handling. This is beneficial for RRC signalling or Ultra-Reliable and Low-Latency Communications (URLLC) data.

There are (at least) two options for conveying this additional information in SR. The first option is to introduce multiple SR configurations for single-bit SR, where different SR resources (in either time domain or frequency domain) are allocated to different LCHs or LCGs. The LCG is a group of one or more Logic Channels for which buffer status is being reported to simplify resource allocation and reporting mechanism in the MAC layer. In the following, LCH and LCG are both mentioned separated with a dash (LCHs/LCG), referring to LCH and/or LCG. If the UE triggers SR separately and/or transmits SR by using the associated SR configurations, upon reception of a SR, gNB can identify the associated LCHs/LCG. As another implementation, different SR transmission periodicities can be used for different SR configurations. In this way, the LCHs/LCGs with higher priority levels can be configured with shorter SR transmission intervals, while LCHs/LCGs with lower priority levels can be configured with longer SR transmission intervals.

The second option is to support multi-bit SR. With more bits used in SR it would be possible for a UE to provide more detailed information, such as the type/priority of the logical channel which has data available. How many bits that SR should be extended with, is a question of how to achieve a good trade-off between the increased L1 control channel issues (overhead, design complexity, etc.) and the possible gain achieved in terms of UP latency reduction.

The first option is an enhancement based on LTE SR format, therefore requires minimal standardization efforts. The second option aims to a new PUCCH format which requires a larger standardization effort, and incurs higher control signaling overhead. Both options are contemplated within the broad scope of embodiments.

According to embodiments, a UE maintains SR configurations, which for example distinguish the numerology/TTI type for each LCH/LCG. When a SR is triggered by certain LCH/LCG, the UE uses the SR configuration associated with that LCH/LCG.

In one embodiment, when a certain logical channel or logical channel group triggers a SR, the UE uses the SR configuration associated with that logical channel or logical channel group. Upon reception of the SR, the network identifies its associated LCH/LCG based on the SR configuration/pattern that was used. Because LCHs/LCGs have different priorities, the network inherently becomes aware of the priority associated with the requested data transfer.

A UE may be configured with different SR resources to differentiate among plural SR configurations. This will increase the resource consumption for the control channel. To limit the overhead due to this, it may be sufficient to only differentiate SRs for LCH/LCG with higher priority levels. The accurate scheduling information for LCH/LCG with lower priority levels can be signalled via BSR. Considering that in LTE a UE is able to support up to 4 LCGs, the number of SR resources being around 4 seems to be a good starting point, although the present invention is not limited to this number.

Each LCH/LCG may be configured with different TTI lengths or numerology characteristics by the network. Accordingly, the network has full knowledge of the TTI lengths/numerology characteristics associated with each LCH/LCG. Upon reception of a SR, the network identifies its associated LCH/LCG based on the SR configuration or multi-bit pattern of the SR. Based on the mapping relation between TTI lengths/numerology characteristics and the logical channels, the network can further identify the "numerology/TTI type" associated with the SR. An UL grant transmitted to the UE in response to the SR may then indicate the numerology/TTI type for the associated uplink data transmission.

According to one embodiment, the network prepares multiple SR configurations for a UE, based on knowledge of the logical channels and the bearer types of this UE. Each configuration includes the settings for a different SR resource (i.e., in frequency or time domain). This means that each configuration may be assigned with a different SR resource. The network then sends these configurations to a UE via dedicated Radio Resource Control (RRC) signaling messages.

In one embodiment, upon reception of a SR sent by a UE, the network identifies the logical channel or logical channel group that triggered the SR.

In one embodiment, the network may activate or deactivate certain SR configurations. The activation/deactivation command may be sent by the network via a RRC signaling, or a MAC Control Element (CE) (i.e., either a new MAC CE or by reusing some existing MAC CE), or other commands carried by a Layer 1 or Layer 2 message. One example is to carry such command via a control channel, such as PDCCH.

In one embodiment, the network may switch from a first SR configuration to a different SR configuration in the case that a UE uses only one configuration at a time (even though this UE may be configured with multiple SR configurations). The switch signaling can be sent by the network via a RRC signaling, or a MAC CE (i.e., either a new MAC CE or by reusing some existing MAC CE) or other commands carried by a Layer 1 or Layer 2 message. One example is to carry such command via a control channel, such as PDCCH.

In one embodiment, the UE may send signaling to the network indicating preferred SR configurations from the UE's perspective (although this UE may be configured with multiple SR configurations). In response, the network may send switch signaling via RRC signaling, or a MAC CE (i.e., either a new MAC CE or by reusing some existing MAC CE), or other commands carried by a Layer 1 or Layer 2 message.

In one embodiment, the SR format (e.g., with more than 1 bit) may be adjusted according to how SR configurations are defined. In one example, a SR may carry the index of a logical channel or a group of logical channels. In another example, a SR may carry the index of a specific configuration associated with a logical channel or a group of logical channels.

In one embodiment, the SR configurations may be adjusted according to the SR format (e.g., one bit, multiple bits, or the capability that a SR can bear) or the availability of system resources. In one example, the number of SR configurations or the content of each configuration is adjusted depending on whether a single-bit SR or multi-bit SR is used. With a multi-bit SR, one SR configuration may be sufficient. Otherwise, multiple SR configurations may be necessary. In another example, multiple SR configurations can be provided if there are multiple SR resources reserved for SR control channel. If there are only a few SR resources assigned/reserved by the network, fewer SR configurations or a single SR configuration may be provided to the UE.

Figure 2:
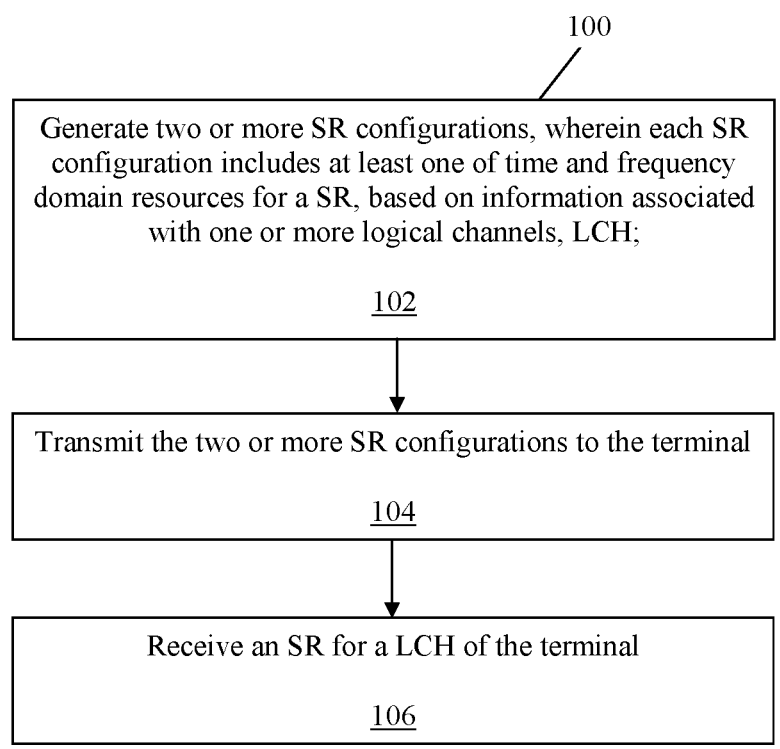
FIG. 2 is a flow diagram of a method of configuring a terminal with SR configurations.

FIG. 2 depicts a method 100, performed by a base station (e.g., eNB, gNB) operative in a wireless communication network (e.g., LTE, NR), of configuring a terminal, such as for example a UE, with SR configurations. The base station generates two or more SR configurations (block 102). Each SR configuration includes at least one of time and frequency domain resources for a SR, based on information associated with one or more logical channels (LCH). The base station then transmits the two or more SR configurations to the first UE (block 104). The base station receives an SR for a LCH of the terminal (block 106). The SR may be received on a resource indicated by a SR configuration associated with the LCH.

Figure 3:
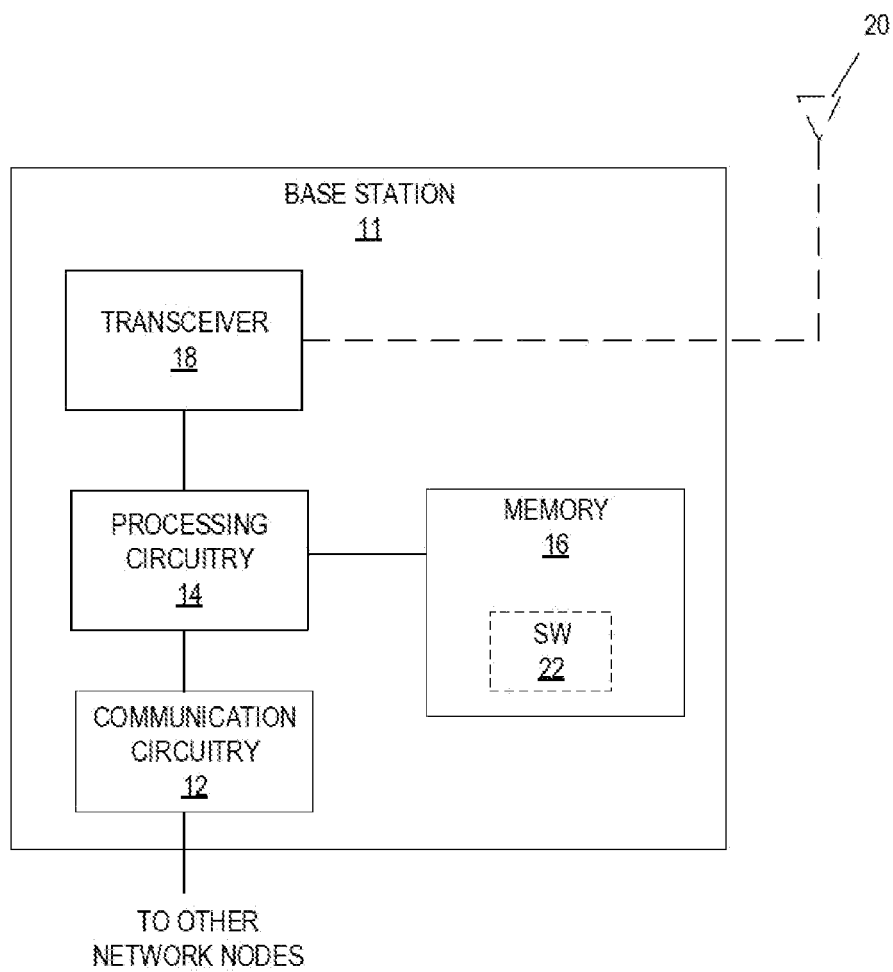
FIG. 3 is a block diagram of a base station operative to perform the method of FIG. 1.

FIG. 3 depicts a base station 11 operative in a wireless communication network, such as LTE or NR. According to one embodiment, the base station 11 is configured to generate two or more Scheduling Request (SR) configurations, wherein each SR configuration includes at least one of time and frequency domain resources for a SR, based on information associated with one or more logical channels (LCH). The base station 11 is further configured to transmit the two or more SR configurations to a terminal 31; and to receive an SR for a LCH of the terminal 31. According to one embodiment, the SR for a LCH is received on a resource indicated by a SR configuration associated with the LCH.

According to a further embodiment the base station 11 includes communication circuits 12 operative to exchange data with other network nodes; processing circuitry 14; memory 16; and radio circuits, such as a transceiver 18, and possibly one or more antennas 20, to effect wireless communication across an air interface to one or more UEs. The antenna(s) 20 may be physically located separately from the base station 11, such as mounted on a tower, building, or the like. As such, the antenna(s) 20 may not be considered as part of the base station 11. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud").

According to one embodiment, the processing circuitry 14 is operative to cause the base station 11, to generate and transmit to a UE two or more SR configurations, as described and claimed herein. In particular, the processing circuitry 14 is operative to perform the method 100 described and claimed herein. This allows the base station 11 to ascertain more information relating the LCH/LCG triggering a SR than is available from a single-bit SR.

Figure 4:
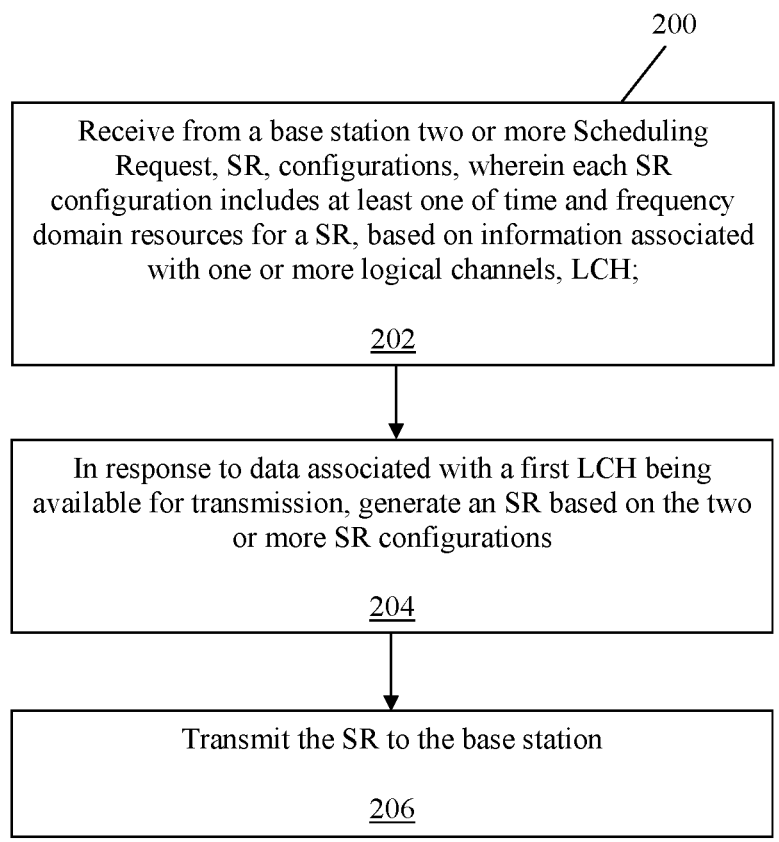
FIG. 4 is a flow diagram of a method of transmitting SRs.

FIG. 4 depicts a method 200, performed by a terminal, such as for example a UE, operative in a wireless communication network (e.g., LTE, NR), of transmitting SR. The UE receives from a base station 11 two or more SR configurations (block 202). Each SR configuration includes at least one of time and frequency domain resources for a SR, based on information associated with one or more logical channels (LCH). In response to data associated with a first LCH being available for transmission, the UE generates an SR based on the two or more SR configurations (block 204). The UE then transmits the SR to the base station (block 206). For the transmission of the SR to the base station the UE may use a transmission resource indicated by the SR configuration associated with the first LCH.

Figure 5:
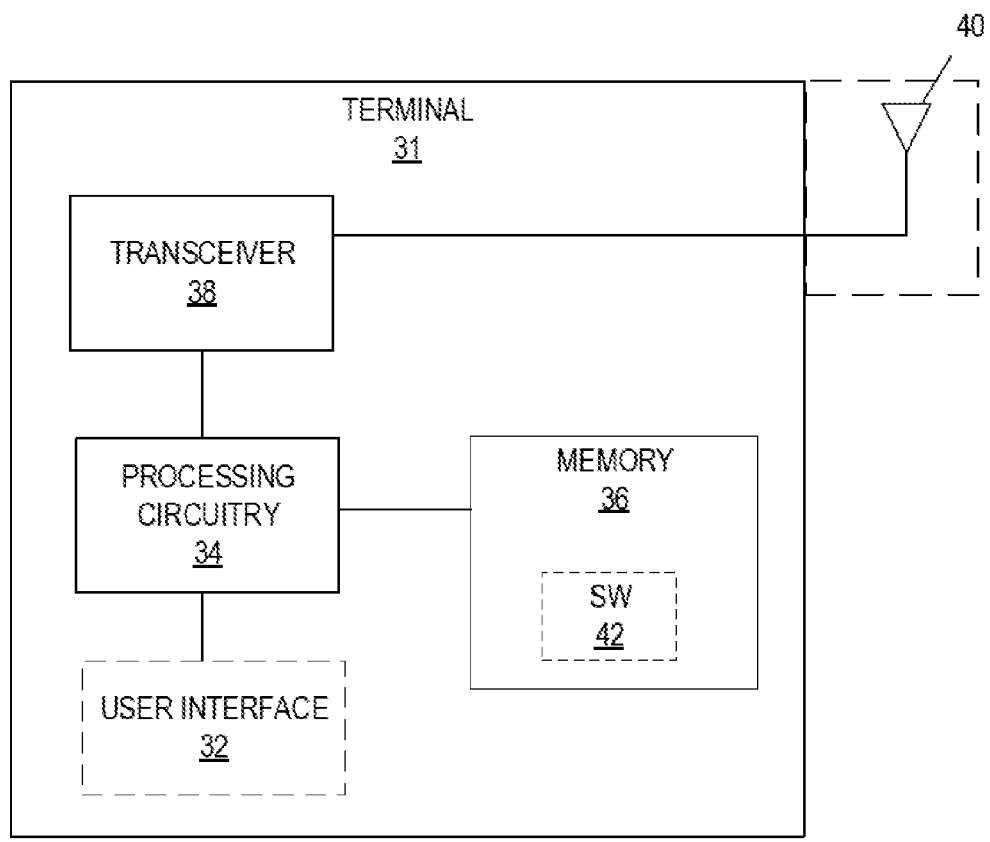
FIG. 5 is a block diagram of a terminal operative to perform the method of FIG. 3.

FIG. 5 depicts a terminal 31, such as a UE, operative a wireless communications network, such as LTE or NR. A terminal 31 is any type device capable of communicating with a network node and/or access point using radio signals. A terminal 31 may therefore refer to a machine-to-machine (M2M) device, a machine-type communications (MTC) device, a Narrowband Internet of Things (NB IoT) device, etc. The terminal 31 may also be mobile terminal, such as a cellular telephone or "smartphone." A terminal 31 may also be referred to as a radio device, a radio communication device, a radio network device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. In some embodiments, these terminals 31 may be configured to transmit and/or receive data without direct human interaction.

According to one embodiment the terminal 31 is configured to receive, from a base station 11, two or more SR configurations, wherein each SR configuration includes at least one of time and frequency domain resources for a SR, based on information associated with one or more logical channels (LCH). The terminal 31 is further configured to generate an SR based on the two or more SR configurations in response to data associated with a first LCH being available for transmission, and to transmit the SR to the base station 11. The terminal 31 may further be configured to transmit the SR to the base station 11 using a transmission resource indicated by the SR configuration associated with the first LCH.

In some embodiments, the terminal 31 includes a user interface 32 (display, touchscreen, keyboard or keypad, microphone, speaker, and the like); in other embodiments, such as in many M2M, MTC, or NB IoT scenarios, the terminal 31 may include only a minimal, or no, user interface 32 (as indicated by the dashed lines of block 32 in FIG. 5). The terminal 31 also includes processing circuitry 34; memory 36; and radio circuits, such a transceiver 38, one or more antennas 40, and the like, to effect wireless communication across an air interface to one or more base stations 11. As indicated by the dashed lines, the antenna(s) 40 may protrude externally from the terminal 31, or the antenna(s) 40 may be internal. In some embodiments, the terminal 31 may additionally include sophisticated functionality, such as a still and/or video camera, accelerometer, satellite navigation signal receiver circuitry, vibrating motor, and the like (not depicted in FIG. 5).

According to embodiments, the memory 36 is operative to store, and the processing circuitry 34 operative to execute, software 42 which when executed is operative to cause the terminal 31 to generate and send SR according to two or more received SR configurations, as described and claimed herein. In particular, the software 42, when executed on the processing circuitry 34, is operative to perform the method 200 described and claimed herein. This allows the terminal 31 to indicate to a base station 11 LCH/LCG information such as priority, numerology/TTI type, and the like, associated with data flows for which scheduling is requested, with a minimum of overhead signaling.

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, NR, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. In some embodiments, logical channels with critical Quality of Service (QoS) requirements can be better serviced. In some embodiments, uplink latency can be reduced for data flows with critical latency requirements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, performed by a base station operative in a wireless communication network, of configuring a terminal with Scheduling Request, SR, configurations, comprising:
   generating two or more SR configurations, wherein each SR configuration includes at least one of time and frequency domain resources for a SR, based on information associated with one or more logical channels, LCH;
   transmitting the two or more SR configurations to the terminal; and
   receiving an SR for a LCH of the terminal.

2. The method of claim 1, wherein the SR for a LCH of the terminal is received on a resource indicated by a SR configuration associated with the LCH.

3. The method of claim 1, further comprising, after receiving an SR transmitted by the terminal:
   identifying, based on the SR configurations for the terminal, a LCH that triggered the SR; and
   ascertaining a priority associated with a data transmission associated with the SR, based on identification of the LCH.

4. The method of claim 1, further comprising, after receiving the SR from the terminal:
   transmitting an uplink grant to the terminal;
   wherein the uplink grant indicates a numerology or TTI length for the associated uplink data transmission.

5. The method of claim 1, further comprising:
   activating or deactivating a specific SR configuration for the terminal by transmitting to the terminal an activation or deactivation command, respectively, identifying the specific SR configuration.

6. The method of claim 1, further comprising:
   switching the terminal from a first SR configuration to a second SR configuration by transmitting to the terminal an activation command identifying the second SR configuration.

7. The method of claim 6, further comprising:
   receiving, from the terminal which is using the first SR configuration for SR transmissions, signaling indicating a preference for the second SR configuration; and
   switching the terminal from the first SR configuration to the second SR configuration by transmitting to the terminal an activation command identifying the second SR configuration in response to the received signaling.

8. The method of claim 1, wherein generating two or more SR configurations comprises generating multiple SR configurations if multiple SR resources are reserved for an SR control channel, and fewer SR configurations if fewer SR resources are reserved for the SR control channel.

9. A base station operative in a wireless communication network, comprising:
   a transceiver; and
   processing circuitry operatively connected to the transceiver and configured to:
      generate two or more Scheduling Request, SR, configurations, wherein each SR configuration includes at least one of time and frequency domain resources for a SR, based on information associated with one or more logical channels, LCH;
      cause the transceiver to transmit the two or more SR configurations to a terminal; and
      cause the transceiver to receive an SR for a LCH of the terminal.

10. The base station of claim 9, wherein the SR for a LCH of the terminal is received on a resource indicated by a SR configuration associated with the LCH.

11. The base station of claim 9, wherein the processing circuitry is further configured to, after receiving an SR transmitted by the terminal:
    identify, based on the SR configurations for the terminal, a LCH that triggered the SR; and
    ascertain a priority associated with a data transmission associated with the SR, based on identification of the LCH.

12. The base station of claim 9, wherein the processing circuitry is further configured to, after receiving the SR from the terminal:
    cause the transceiver to transmit an uplink grant to the terminal;
    wherein the uplink grant indicates a numerology or TTI type for the associated uplink data transmission.

13. The base station of claim 9, wherein the processing circuitry is further configured to:
    activate or deactivate a specific SR configuration for the terminal by causing the transceiver to transmit to the terminal an activation or deactivation command, respectively, identifying the specific SR configuration.

14. The base station of claim 9, wherein the processing circuitry is further configured to:
    switch the terminal from a first SR configuration to a second SR configuration by causing the transceiver to transmit to the terminal an activation command identifying the second SR configuration.

15. The base station of claim 9, wherein the processing circuitry is further configured to:
    cause the transceiver to receive, from the terminal using the first SR configuration, signaling indicating a preference for the second SR configuration; and switch the terminal from the first SR configuration to the second SR configuration by causing the transceiver to transmit to the terminal an activation command identifying the second SR configuration in response to the received signaling.

16. The base station of claim 9, wherein the processing circuitry is configured to generate two or more SR configurations by generating multiple SR configurations if multiple SR resources are reserved for an SR control channel, and fewer SR configurations if fewer SR resources are reserved for the SR control channel.

17. A method, performed by a terminal operative in a wireless communication network, of transmitting Scheduling Requests, SR, comprising:
    receiving from a base station two or more SR configurations, wherein each SR configuration includes at least one of time and frequency domain resources for a SR, based on information associated with one or more logical channels, LCH;
    in response to data associated with a first LCH being available for transmission, generating an SR based on the two or more SR configurations; and
    transmitting the SR to the base station.

18. The method of claim 17, wherein the SR is transmitted to the base station by using a transmission resource indicated by the SR configuration associated with the first LCH.

19. The method of claim 17, further comprising, after transmitting the SR to the base station:
    receiving an uplink grant from the base station;
    wherein the uplink grant indicates a numerology or TTI type for the associated uplink data transmission.

20. The method of claim 17, further comprising:
    receiving from the base station an activation or deactivation command identifying a specific SR configuration; and
    activating or deactivating the specific SR configuration, respectively.

21. The method of claim 20, wherein the terminal uses a first SR configuration, further comprising, prior to receiving an activation command from the base station:
    transmitting signaling to the base station indicating a preference for a second SR configuration.

22. A terminal operative in a wireless communication network, comprising:
    one or more antennas;
    a transceiver operatively connected to the antennas; and
    processing circuitry operatively connected to the transceiver and operative to cause the terminal to:
        receive from a base station two or more Scheduling Request, SR, configurations, wherein each SR configuration includes at least one of time and frequency domain resources for a SR, based on information associated with one or more logical channels, LCH;
        in response to data associated with a first LCH being available for transmission, generate an SR based on the two or more SR configurations; and
        transmit the SR to the base station.

23. The terminal of claim 22, wherein the SR is transmitted to the base station by using a transmission resource indicated by the SR configuration associated with the first LCH.

24. The terminal of claim 22, wherein the processing circuitry is further operative to cause the terminal to, after transmitting the SR to the base station:
    receive an uplink grant from the base station;
    wherein the uplink grant indicates a numerology or TTI type for the associated uplink data transmission.

25. The terminal of claim 22, wherein the processing circuitry is further operative to cause the terminal to:
    receive from the base station an activation or deactivation command identifying a specific SR configuration; and
    activate or deactivate the specific SR configuration, respectively.

26. The terminal of claim 25, wherein the terminal uses a first SR configuration, the processing circuitry is further operative to cause the terminal to, prior to receiving an activation command from the base station:
    transmit signaling to the base station indicating a preference for a second SR configuration.

* * * * *